Aug. 12, 1969     E. FELIX     3,461,299
APPARATUS FOR PHOTO-ELECTRIC DETECTION OF DOUBLE THREADS
Filed April 12, 1966     2 Sheets-Sheet 2
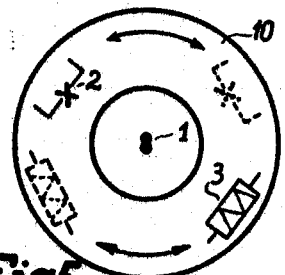
Fig. 5
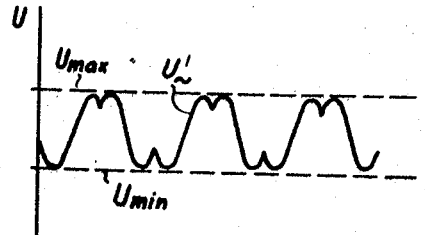
Fig. 6
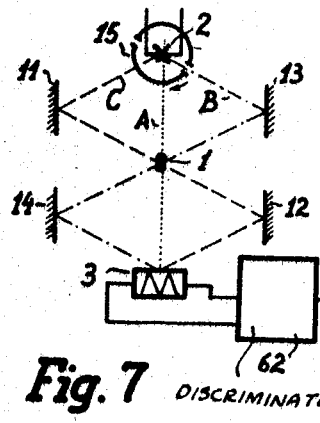
Fig. 7   DISCRIMINATOR
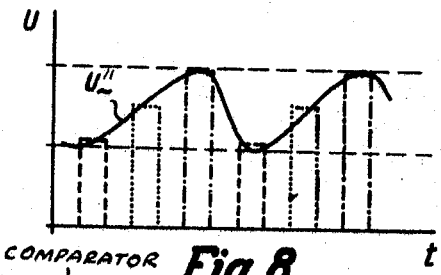
Fig. 8
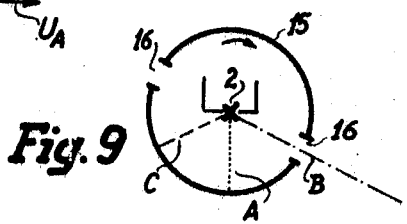
Fig. 9
INVENTOR
ERNST FELIX
BY
Kenyon & Kenyon
ATTORNEYS United States Patent Office 3,461,299
Patented Aug. 12, 1969

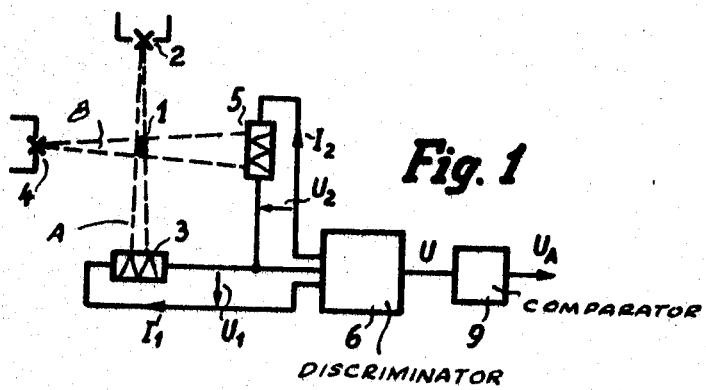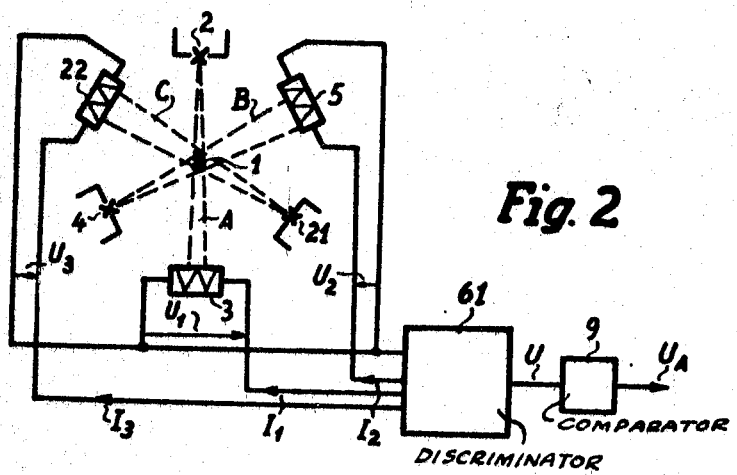

3,461,299
APPARATUS FOR PHOTO-ELECTRIC DETECTION OF DOUBLE THREADS
Ernst Felix, Uster, Switzerland, assignor to Zellweger Ltd., Uster, Switzerland, a Swiss corporation
Filed Apr. 12, 1966, Ser. No. 542,033
Claims priority, application Switzerland, May 25, 1965, 7,502/65
Int. Cl. G01n 21/30
U.S. Cl. 250—219                4 Claims

ABSTRACT OF THE DISCLOSURE

A photocell arrangement is mounted on a disc which oscillates about the path of the thread to be measured. By comparing the electrically produced signal with the maximum and minimum signals corresponding to the measured diameter of the thread, a double thickness thread can be detected. Also, a stationary photocell arrangement can be used wherein a signal is produced by bouncing a light beam off a series of mirrors in chronological order so as to produce two signals which can be compared in order to detect the presence of a double thread.

---

This invention relates to an apparatus and method for detecting double threads. More particularly, this invention relates to an apparatus and method for detecting double threads in textile machinery. Still more particularly, this invention relates to an apparatus and method for detecting traveling double threads in textile machinery.

It is important in the textile art that the presence of double threads in a traveling thread be detected rapidly and accurately in order to avoid the problems attendant therewith in subsequent textile operations. Accordingly, accurate thread cross-section measurements are made at the thread locations where double threads are most likely to occur. The devices used to make such measurements generally produce a signal corresponding to the measured thread cross-section which is utilized to actuate other devices capable of eliminating the undesired effects of double threads.

Heretofore, the arrangements used to measure thread cross-sections to detect double threads have been based on the assumption that the cross-section of a double thread is twice the cross-section of a single thread. This, however, is not always true because the cross-section of thread is irregular due to the random distribution of the filaments in the thread. Thus, it is quite possible that a single thread has a portion having a cross-section which is twice as great as the average cross-section of the thread in such a case the conventional arrangements indicate a double thread where there is, in fact, only a single thread.

Conversely, thin portions of two adjacent threads forming a double thread may accidentally be in the same location so that the total cross-section of the two threads at that location is at most only slightly greater than the average cross-section of a single thread. Thus, there is no definite distinction between the cross-section of a single thread and that of a double thread so that the heretofore used arrangements by merely measuring the cross-section of thread material at a certain location have not clearly indicated whether a single or a double thread has been present.

It is an object of this invention to provide an apparatus and method for rapidly and accurately detecting double threads in textile machinery.

It is another object of this invention to provide an apparatus and method for measuring at least two angularly displaced diameters of a traveling thread cross-section to detect the presence of a double thread.

It is another object of this invention to provide an apparatus and method for directing a plurality of detection beams transversely across the path of a traveling thread to detect the presence of a double thread.

Generally, this invention provides an apparatus for detecting double threads in a traveling thread at a predetermined location which includes a measuring means for measuring at least two angularly displaced diameters of the thread cross-section at the predetermined location and a means operatively connected to the measuring means for comparing the measurements of the measured diameters and for producing an output signal corresponding to the difference between the measurements of at least two of the measured diameters.

The method of the invention generally comprises the steps of measuring at least two angularly displaced diameters of a thread cross-section at a predetermined location, comparing the measurements of the measured diameters and producing an output signal corresponding to the difference between the measurements of at least two of the measured diameters.

These and other objects and advantages of the invention will become more apparent from the following detained description taken in conjunction with the appended drawings in which:

FIG. 1 illustrates a schematic arrangement of a pair of detection means directed at right angles to each other according to the invention;

FIG. 2 illustrates a modification of the invention utilizing three detection means spaced equidistant from each other;

FIG. 3 illustrates another modification of the invention utilizing a single rotating detection means;

FIG. 4 illustrates graphically the chronological sequence of voltage of the output signal of the detection means of FIG. 3;

FIG. 5 illustrates another modification of the invention utilizing a single oscillating detection means;

FIG. 6 illustrates graphically the chronological sequence of voltage of the output signal of the detection means of FIG. 5;

FIG. 7 illustrates another modification of the invention utilizing a single detection means;

FIG. 8 illustrates graphically the chronological sequence of voltage of the output signal of the detection means of FIG. 7; and FIG. 9 is an enlarged view of a portion of the detection means of FIG. 7.

Referring to FIG. 1, a double thread 1 made up of a pair of adjacent threads travels axially through a measuring apparatus which comprises a pair of detection means for measuring the cross-section of the traveling thread 1 in two angularly displaced directions. Each detection means measures a diameter of the thread cross-section the length of which depends upon whether the detection means measures in a direction either normal or parallel to the plane in which the two threads are located. The measuring apparatus is thus capable of accurately determining whether or not the detected thread cross-section is circular or non-circular.

Each of the detection means incorporates, for example, a light source 2, 4 and a light sensitive receiver 3, 5 for receiving a light beam A, B. The light sensitive receivers 3, 5 which may be formed of conventional photoelectric cells are connected to a discriminator 6 in opposition to each other in a conventional manner to produce an output signal U when the currents of the photoelectric cells are different.

When there is a single thread present in the measuring arrangement, the cross-section being circular, the thread will occult equal areas in the beams A and B so that the photocurrents $I_1$, $I_2$ in the respective photoelectric cells are equal. The discriminator 6 will thus not emit a signal.

When there is a double thread present in the measuring arrangement, as shown, the cross-section being non-circular, the light beam B which is normal to the plane wherein the threads are located is occulted more than the light beam A which is parallel to the plane of the threads. This results in different currents in the photoelectric cells which cause an output signal U to be produced in the discriminator 6.

Since small deviations from a truly circular cross-section occur in a thread due to inherent irregularities and since a single thread can cause a slight difference in magnitude between the photocurrents $I_1$ and $I_2$, there can be a relatively small output signal emitted by the discriminator 6. However, double threads will always cause differences between the photocurrents which are relatively much greater than the slight differences caused by a single thread. Therefore, a level switch or comparator 9 with an adjustable threshold valve is connected to the output of the discriminator 6. The threshold valve is adjusted to a value such that only those signals U which produce an output voltage $U_A$, the amplitude of which corresponds to the difference between the voltage $U_1$ and $U_2$ effected by the respective photoelectric cells when a double thread passes the measuring point, pass through the comparator 9.

Referring to FIG. 2, since there is a possibility that the threads forming a double thread 1 will not be located in a plane parallel to one of the light beams A, B, for instance, a plane at 45° with respect to one of the beams A, B, thereby permitting the current $I_1$ and $I_2$ to be substantially equal so as to prevent the apparatus from responding to the presence of a double thread, the measuring apparatus is provided with three detection means spaced equidistantly from each other at angles of 120° around the longitudinal axis of the traveling thread. However, any number of equi-spaced detection means can be utilized. As above, each detection means comprises a light source 2, 4, 21, which passes a light beam A, B, C, to a photoelectric cell 3, 5, 22. The photoelectric cells 3, 5, 22 are connected to a discriminator 61 having three inputs which produces signals corresponding to the difference between the output of any one of the photoelectric cells and all of the remaining photoelectric cells. Where three cells are used, there are always at least two different voltages present notwithstanding the orientation of the double thread 1. Further, the level switch or comparator 9 always receives a signal U which exceeds the threshold valve when a double thread is present.

The expense of providing two or more light beam detection means with corresponding switch means can be avoided by providing a single detection means which measures the traveling thread from different positions in consecutive steps rather than simultaneously. Referring to FIG. 3, an example of such an apparatus comprises a detection device having a light source 2 and photoelectric cell 3 mounted on a disc 10 which rotates concentrically about and in a plane normal to the traveling thread so that the entire circumferential surface of the traveling thread is scanned during one revolution of the disc 10.

Where the thread cross-section is non-circular, a superimposed alternating voltage signal $U_\sim$ is imposed on the photoelectric cell 3. Such a signal can be used by simple conventional devices to produce signals corresponding to the magnitude of the alternating voltage component which are suitable to distinguish a double thread from a single thread. For example, referring to FIG. 4, the alternating voltage signal $U_\sim$ can be superimposed on a mean direct current voltage having the extreme values $U_{Max.}$ and $U_{Min.}$.

Referring to FIGS. 5 and 6, where it is not necessary to scan the entire circumferential surface but only a part of the circumferential surface of the traveling thread, for example, an angular segment of 120°, the disc 10 as described above need only be oscillated through the required angle (i.e. 120°). The resulting signal $U_\sim'$, plotted in FIG. 6, is fundamentally an alternating voltage which indicates differences between diameters of the scanned thread cross-section during one oscillation of the disc 10.

The detection device shown in both FIGS. 3 and 5 rotate or oscillate respectively around a non-rotating or non-oscillating traveling thread, however, the devices can be made stationary with the thread being rotated or oscillated about the longitudinal axis thereof by suitable conventional means, for example, by applying a "false twist," since the same results would be produced.

Referring to FIGS. 7 to 9, a further example of an apparatus for chronologically staggerring the scanning of a thread cross-section includes a single light source 2 which is concentrically surrounded by a rotatable masking cylinder 15 which is provided with slots 16 for the emission of a light beam therethrough and two pairs of mirrors 11, 12 and 13, 14 which are arranged to direct light beams B and C to meet the thread from two directions spaced apart 120°. As the masking cylinder 15 rotates about the light source 2 one of the slots 16 permits the light beam A to extend directly from the light source 2 to a photoelectric cell 3 and to be occulted by the thread 1. Upon continued rotation, the same slot allows the light beam B to extend indirectly from the light source 2 to the cell 3 by being reflected by the mirrors 13 and 14 and to be occulted by the thread 1 between the mirrors 13, 14. Subsequently, the light beam C is extended indirectly to the cell 3 by reflection off the mirrors 11, 12 and occulted by the thread 1.

The cell 3 is connected to a discriminator 62 and delivers a voltage $U_\sim''$ to the input of the discriminator. The voltage $U_\sim''$ is an alternating current voltage which has an amplitude which corresponds directly to the magnitude of the deviation of the circumference of a thread cross-section from a circular configuration. The discriminator 62 responds to the voltage $U_\sim''$ by producing a signal U which exceeds the threshold limit of the switch 9 when a double thread is detected to emit a final output signal $U_A$ from the switch 9.

By using a single movable detection means to chronologically stagger the measurements of a thread cross-section instead of a plurality of detection means which measure simultaneously, any disturbing influences which may effect the light source, photoelectric cell, or discriminator cause the same effect in all measurments and have little or no effect on the ultimate output signal $U_A$.

Having thus described the invention, it is not intended that it be so limited as changes may be readily made therein without departing from the scope of the invention. Accordingly, it is intended that the foregoing description and appended drawings be interpreted as illustrative only.

What is claimed is:

1. An apparatus for the photoelectric detection of double threads including means for measuring the diameter of the thread cross-section, said measuring means including a single detection means having a light source, a rotatable masking cylinder concentrically mounted about said light source, said masking cylinder having at least one slot therein for emitting a light beam from said light source therethrough, a photoelectric receiver for receiving a light beam directed from said light source and for producing an electrical current in response to the light received, and two pairs of mirrors arranged to direct a pair of light beams from said light source to meet the travelling thread at an angle of 120° and said cell at an angle of 120° whereby the electrical current produced is in proportion to the diameter of the measured thread cross-section.

2. An apparatus as set forth in claim 1 which further includes means operably connected to said measuring means for comparing the measurements of said diameters and for producing an output signal corresponding to the difference between the measurements of at least two of said diameters to detect the presence of a double thread.

3. An apparatus for photoelectric detection of double threads having means for measuring the diameter of the thread cross-section, said means comprising a rotatable disc concentrically mounted about the travelling thread, a light source mounted on said disc for directing a light beam perpendicularly towards the travelling thread, and a photoelectric cell mounted on said disc for receiving the light beam directed from said light source and for producing an electrical current in response to the light received, whereby reciprocation of said disc around its axis by an angle of at least 90° periodically measures the diameter of the thread cross-section from different directions.

4. An apparatus as set forth in claim 3 which further includes means operably connected to said measuring means for comparing the measurements of said diameters to a maximum and minimum measurement for producing an output signal corresponding to the presence of a double thread.

References Cited

UNITED STATES PATENTS

| | | | |
|---|---|---|---|
| 2,413,486 | 12/1946 | Denyssen | 250—219 |
| 2,895,373 | 7/1959 | Eyraud | 88—14 |
| 2,991,685 | 7/1961 | Dongeren | 88—14 |
| 3,053,986 | 9/1962 | Loepfe et al. | 250—219 |
| 3,264,922 | 8/1966 | Peyer | 88—14 |
| 3,305,687 | 2/1967 | Vinzelberg et al. | 250—219 |

WALTER STALWEIN, Primary Examiner

U.S. Cl. X.R.

250—236; 356—159